United States Patent
Qin et al.

(10) Patent No.: US 10,955,818 B2
(45) Date of Patent: Mar. 23, 2021

(54) SYSTEM AND METHOD FOR EXTRACTING PRINCIPAL TIME SERIES DATA

(71) Applicant: University of Southern California, Los Angeles, CA (US)

(72) Inventors: Si-Zhao Qin, Arcadia, CA (US); Yining Dong, San Jose, CA (US)

(73) Assignee: University of Southern California, Los Angeles, CA (US)

( * ) Notice: Subject to any disclaimer, the term of this patent is extended or adjusted under 35 U.S.C. 154(b) by 279 days.

(21) Appl. No.: 15/926,962

(22) Filed: Mar. 20, 2018

(65) Prior Publication Data

US 2018/0267503 A1    Sep. 20, 2018

Related U.S. Application Data

(60) Provisional application No. 62/473,971, filed on Mar. 20, 2017.

(51) Int. Cl.
| | |
|---|---|
| *G05B 19/408* | (2006.01) |
| *G05B 19/418* | (2006.01) |
| *G05B 13/04* | (2006.01) |
| *G06K 9/00* | (2006.01) |
| *G05B 23/02* | (2006.01) |
| *G06F 17/11* | (2006.01) |

(52) U.S. Cl.
CPC .......... *G05B 19/408* (2013.01); *G05B 13/04* (2013.01); *G05B 19/418* (2013.01); *G05B 23/0224* (2013.01); *G06K 9/00* (2013.01); *G05B 2219/31093* (2013.01); *G06F 17/11* (2013.01); *Y02P 90/02* (2015.11)

(58) Field of Classification Search
None
See application file for complete search history.

(56) References Cited

PUBLICATIONS

Chen et al. (PCA-ARMA-Based Control Charts for Performance Monitoring of Multivariable Feedback Control, Ind. Eng. Chem Res . 2010, 49, 2228-2241 (Year: 2010).*
Martens, H., Naes, T. Norris, K. (1987) Multivariate Calibration by Data Compression. In Williams, P. and Norris, K., Eds, Near-Infrared Technology in the Agricultural and Food Industries (pp. 57-87) American Association of Cereal Chemists, St. Paul.
Dong, Y., & Qin, S. J. (2015). "Dynamic-Inner Partial Least Squares for Dynamic Data Modeling." IFACPapersOnLine, 48(8), 117-122.
(Continued)

*Primary Examiner* — Roy Y Yi
(74) *Attorney, Agent, or Firm* — Snell & Wilmer L.L.P.

(57) ABSTRACT

A method for extracting a set of principal time series data of dynamic latent variables. The method includes detecting, by a plurality of sensors, dynamic samples of data each corresponding to one of a plurality of original variables. The method also includes analyzing, using a controller, the dynamic samples of data to determine a plurality of latent variables that represent variation in the dynamic samples of data. The method also includes selecting, by the controller, at least one inner latent variable that corresponds to at least one of the plurality of original variables. The method also includes estimating an estimated current value of the at least one inner latent variable based on previous values of the at least one inner latent variable.

17 Claims, 11 Drawing Sheets

(56) References Cited

PUBLICATIONS

Dong, Yining, and S. Joe Qin (2016). "A Novel Dynamic PCA Algorithm for Dynamic Data Modeling and Process Monitoring." Submitted to Journal of Process Control, 67, 1-11.
Ginsberg, J., M.H. Mohebbi, R.S. Patel, and L. Brammer L, "Smolinski1 MS, Brilliant L. (2009). Detecting Influenza Epidemics Using Search Engine Query Data," Nature, 457, 1012-1014.
Hinton, G. E. and R. Salakhutdinov (2006). "Reducing the Dimensionality of Data with Neural Networks," Science, 313(5786), 504-507.
Jordan, M.I. et al. (2013). "Frontiers in Massive Data Analysis," The National Academies Press.
Keogh, E., and S. Kasetty (2002)., "On the Need for Time Series Data Mining Benchmarks: A Survey and Empirical Demonstration," Proceedings of the eighth ACM SIGKDD international conference on Knowledge discovery and data mining, 102-111.
Ku, W., R. H. Storer, C. Georgakis (1995). Disturbance detection and isolation by dynamic principal component analysis, Chemometrics and intelligent laboratory systems, 30 (1) 179-196.
MacGregor J. F., M. Koutoudi (1995), Statistical process control of multivariate processes, Control Engineering Practice 3, 403-414.
Qin, S. J. (2003), Statistical process monitoring: Basics and beyond, J. Chemometrics, 17, 480-502.
Qin, S. J. and T.J. McAvoy (1992), A Data-Based Process Modeling Approach and Its Applications,Proceedings of the 3rd IFAC DYCORD Symposium, 321-326, College Park, Maryland.
Qin, S. J., Y.Y. Zheng (2013). "Quality-Relevant and Process-Relevant Fault Monitoring with Concurrent Projection to Latent Structures," AIChE Journal, 59, 496-504.
Sun, L., Shuiwang Ji, Shipeng Yu, Jieping Ye (2009). On the Equivalence between Canonical Correlation Analysis and Orthonormalized Partial Least Squares, Proceedings of the Twenty-First International Joint Conference on Artificial Intelligence (IJCAI-09).
Tham, M. (1991). "Soft-Sensors for Process Estimation and Inferential Control," Journal of Process Control, 1(1), 3-14. DOI:10.1016/0959-1524(91)87002-F.
Wise, B. and N. Gallagher (1996). The process chemometrics approach to process monitoring and fault detection, J. Proc. Cont. 6, 329-348.
Yuan, T., and S.J. Qin (2014). "Root Cause Diagnosis of Plant-wide Oscillations Using Granger Causality," Journal of Process Control, 24, pp. 450-459.
Zhu, Q., Q. Liu, and S. J. Qin (2016). Concurrent canonical correlation analysis modeling for qualityrelevant monitoring, Proc. of IFAC Symposium on DYCOPS-CAB, IFAC—PapersOnLine, vol. 49, No. 7, pp. 1044-1049.
J. V. Kresta, J. F. MacGregor, T. E. Marlin, Multivariate statistical monitoring of process operating performance, The Canadian Journal of Chemical Engineering 69 (1) (1991) 35-47.
B. M. Wise, N. Ricker, D. Veltkamp, B. R. Kowalski, A theoretical basis for the use of principal component models for monitoring multivariate processes, Process control and quality 1 (1) (1990) 41-51.
J. F. MacGregor, C. Jaeckle, C. Kiparissides, M. Koutoudi, Process monitoring and diagnosis by multiblock pls methods, AIChE Journal 40 (5) (1994) 826-838.
D. Zhou, G. Li, S. J. Qin, Total projection to latent structures for process monitoring, AIChE Journal 56 (1) (2010) 168-178.
A. Negiz, E. S. Lagergren, A. Cinar, Statistical quality control of multivariable continuous processes, in: American Control Conference, 1994, vol. 2, 1994, pp. 1289-1293.
J. Chen, K.-C. Liu, On-line batch process monitoring using dynamic pca and dynamic pls models, Chemical Engineering Science 57 (1) (2002) 63-75.
N. Lu, Y. Yao, F. Gao, F. Wang, Two-dimensional dynamic pca for batch process monitoring, AIChE Journal 51 (12) (2005) 3300-3304.
W. Lin, Y. Qian, X. Li, Nonlinear dynamic principal component analysis for on-line process monitoring and diagnosis, Computers & Chemical Engineering 24 (2) (2000) 423-429.
G. Li, B. Liu, S. J. Qin, D. Zhou, Dynamic latent variable modeling for statistical process monitoring, in: Proc. IFAC World Congress, Milan, Italy, 2011, pp. 12886-12891.
G. Li, S. J. Qin, D. Zhou, A new method of dynamic latent-variable modeling for process monitoring, Industrial Electronics, IEEE Transactions on 61 (11) (2014) 6438-6445.
S.Wold, A. Ruhe, H.Wold, W. Dunn, III, The collinearity problem in linear regression. the partial least squares (pls) approach to generalized inverses, SIAM Journal on Scientific and Statistical Computing 5 (3) (1984) 735-743.
P. Geladi, B. R. Kowalski, Partial least-squares regression: a tutorial, Analytica chimica acta 185 (1986) 1-17.
G. E. Box, G. M. Jenkins, G. C. Reinsel, Time series analysis: forecasting and control, vol. 734, John Wiley & Sons, 2011.
S. Valle, W. Li, S. J. Qin, Selection of the number of principal components: the variance of the reconstruction error criterion with a comparison to other methods, Industrial & Engineering Chemistry Research 38 (11) (1999) 4389-4401.
I. S. Helland, On the structure of partial least squares regression, Communications in statistics—Simulation and Computation 17 (2) (1988) 581-607.
J.E. Jackson, "A user's guide to principal components," vol. 587, John Wiley & Sons, 2005.
J. E. Jackson, G. S. Mudholkar, Control procedures for residuals associated with principal component analysis, Technometrics 21 (3) (1979) 341-349.
H. H. Yue, S. J. Qin, Reconstruction-based fault identification using a combined index, Industrial & engineering chemistry research 40 (20) (2001) 4403-4414.
Qin, S. Joe, and Yining Dong. "Data Distillation, Analytics, and Machine Learning."

\* cited by examiner

SYSTEM AND METHOD FOR EXTRACTING PRINCIPAL TIME SERIES DATA

CROSS REFERENCE TO RELATED APPLICATIONS

This application claims the benefit and priority of U.S. Provisional Application No. 62/473,971, entitled "SYSTEM AND METHOD FOR EXTRACTING PRINCIPAL TIME SERIES DATA," filed on Mar. 20, 2017, the entire disclosure of which is hereby incorporated by reference herein in its entirety.

BACKGROUND

1. Field

The present disclosure is directed to systems and methods for dynamic data analysis and error detection in industrial equipment and systems.

2. Description of the Related Art

Industrial process data is becoming a massive and increasingly valuable asset for decision making in process operations, process control, and process monitoring. Since process measurements are often highly correlated, latent variable methods, such as principal component analysis (PCA) and partial least squares (PLS), are effective analytic tools for data modeling and process monitoring. In PCA, the objective is to extract latent variables from the data such that the variance of the extracted latent variables is maximized. By applying PCA, the measurement space can be decomposed into a principal subspace with maximized variability and a residual sub-space. Fault detection statistics are developed for each subspace for process monitoring.

One major shortcoming for PCA is the lack of focus on time dependence, i.e., the structure of autocorrelation in the data is not exploited. However, measurements from industrial processes are often both cross-correlated and autocorrelated. Several problems may arise when applying static PCA to dynamic data directly. Since static PCA is unable to extract dynamic relationships from the data, autocorrelation and cross-correlation are mixed together, which makes it difficult for traditional PCA to reveal what type of relations exist among the measured variables. Furthermore, auto-correlations invalidate the statistical properties for fault detection methods developed for traditional PCA. Directly applying traditional fault detection methods may lead to misleading results.

SUMMARY

Described herein is a method for extracting a set of principal time series data of dynamic latent variables. The method includes detecting, by a plurality of sensors, dynamic samples of data each corresponding to one of a plurality of original variables. The method also includes analyzing, using a controller, the dynamic samples of data to determine a plurality of latent variables that represent variation in the dynamic samples of data. The method also includes selecting, by the controller, at least one inner latent variable that corresponds to at least one of the plurality of original variables. The method also includes estimating an estimated current value of the at least one inner latent variable based on previous values of the at least one inner latent variable.

Also disclosed is a method for extracting a set of principal time series data of dynamic latent variables. The method includes detecting, by a plurality of sensors, dynamic samples of data each corresponding to one of a plurality of original variables. The method also includes analyzing, using a controller, the dynamic samples of data to determine a plurality of latent variables that represent variation in the dynamic samples of data. The method also includes selecting, by the controller, at least one inner latent variable that corresponds to at least one of the plurality of original variables based on a desire for at least one of: a relatively large covariance between an estimated current value of the at least one inner latent variable at a selected time and an actual current value of the at least one inner latent variable at the selected time, or a relatively large correlation between the estimated current value of the at least one inner latent variable at the selected time and the actual current value of the at least one inner latent variable at the selected time. The method also includes estimating, by the controller, the estimated current value of the at least one inner latent variable based on previous values of the at least one inner latent variable.

Also disclosed is a system for extracting a set of principal time series data of dynamic latent variables. The system includes a plurality of sensors configured to detect dynamic samples of data each corresponding to one of a plurality of original variables. The system also includes an output device configured to output data. The system also includes a controller coupled to the plurality of sensors and configured to analyze the dynamic samples of data to determine a plurality of latent variables that represent variation in the dynamic samples of data. The controller is further configured to select at least one inner latent variable that corresponds to at least one of the plurality of original variables. The controller is further configured to estimate an estimated current value of the at least one inner latent variable based on previous values of the at least one inner latent variable. The controller is further configured to control the output device to output data based on the estimated current value of the at least one inner latent variable.

DETAILED DESCRIPTION

Industrial process data may be massive and may be relatively high dimensional due to the complexity of process operations and control. Although these measurements are high dimensional, the measured variables usually do not act independently due to process operation requirements and physical constraints. This data is often highly collinear and correlated, making traditional regression methods, such as least squares, unreliable due to ill-conditioning. Regularized least squares methods such as ridge regression may be tuned to achieve reliable prediction with bias and variance trade-off. However, these models are not easily interpretable.

Latent variables methods (LVM), including principal component analysis (PCA), projection to latent structures (PLS), and canonical correlation analysis (CCA), may be preferable for analyzing this high-dimensional and correlated data efficiently. Efficiency of the analysis may be improved by analyzing the dynamics of the latent variables.

Because a relatively large amount of process data is collected in the form of time series, with sampling intervals from seconds to milliseconds, dynamics or time correlations are often strong among the data. These dynamics make static data analytics inadequate, however, they may be modeled appropriately so that they can be useful for prediction and monitoring. Considering the large dimensional time series data that are both cross-correlated and auto-correlated over time, it is desirable to develop dynamic extensions of the latent variable methods such that their current values are best predicted by their past data, using a reduced number of dynamic latent variables. The extracted data of these dynamic latent variables may be referred to as principal time series with reduced dimensions.

Figure 1:
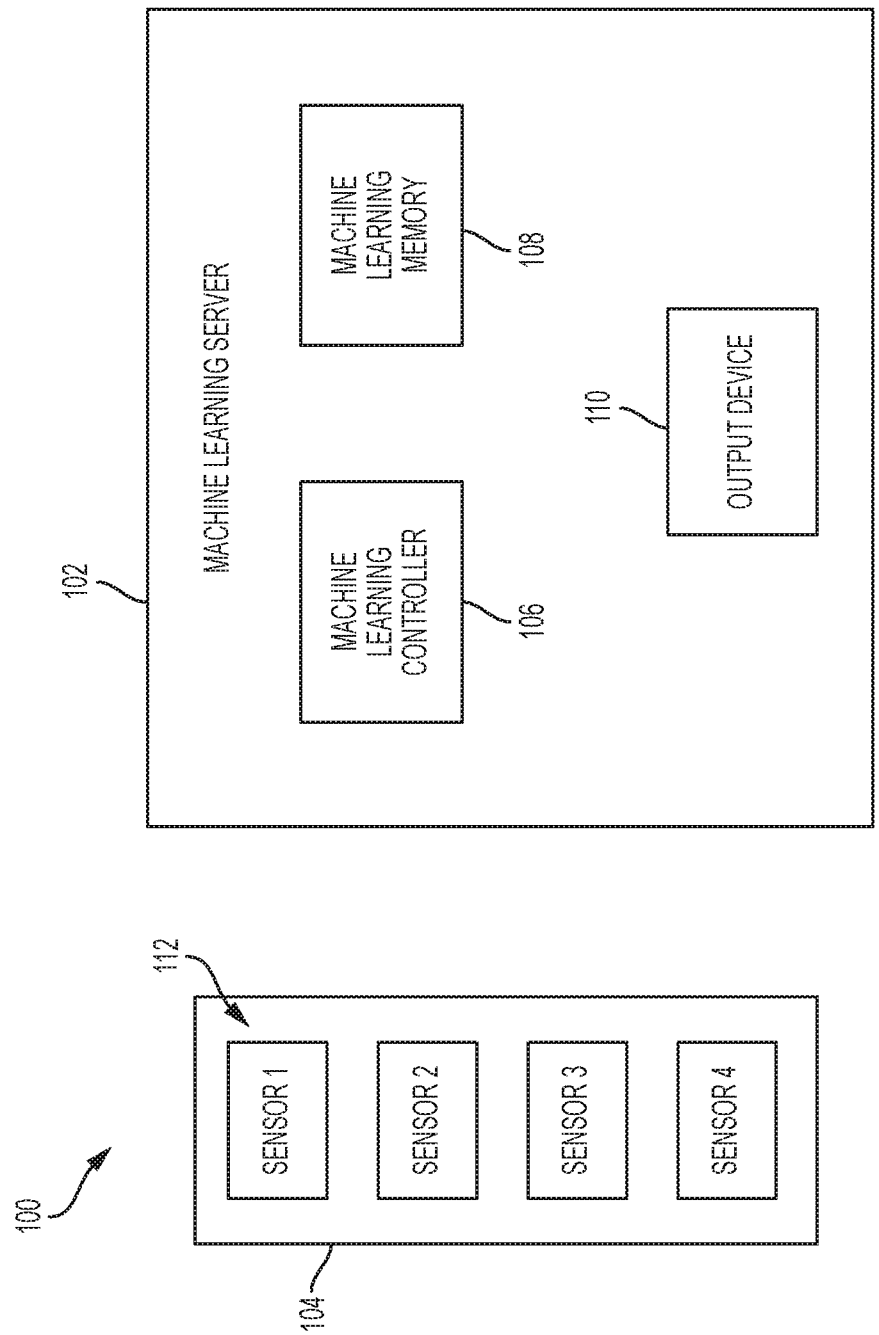
FIG. 1 illustrates a system for extracting principal time series data according to an embodiment of the present invention.

Referring to FIG. 1, a system 100 for analyzing high dimensional complex data is shown. The system 100 includes a machine learning server 102 along with a data source 104. The machine learning server 102 may include a machine learning controller 106, a machine learning memory 108, and an output device 110. Where used herein, "controller" may refer to any logic device capable of receiving one or more input and outputting one or more output. For example, a controller may include a PI controller, a processor, an application specific integrated circuit (ASIC), a digital signal processor (DSP), a field-programmable gate array (FPGA), or the like. In some embodiments, the controller 106 may be specifically designed to process relatively large amounts of data.

The memory 108 may include any non-transitory memory known in the art. In that regard, the memory 108 may store data usable by the controller 106. For example, the memory 108 may store an algorithm usable by the controller 106 to model the data source 104 using a set of principal time series data of dynamic latent variables.

The output device 110 may include any output device such as a display, a touchscreen, a speaker, or the like.

The data source 104 may include, for example, an industrial machine or system such as a chemical manufacturing plant, a warehouse, or the like. The data source 104 may include a plurality of sensors 112. Time series data from the plurality of sensors 112 may be transmitted to the machine learning server 102. The machine learning server 102 may make predictions regarding the data source 104 based on the data detected from the plurality of sensors 112 and based on an algorithm that uses dynamic latent variables.

Figure 2:
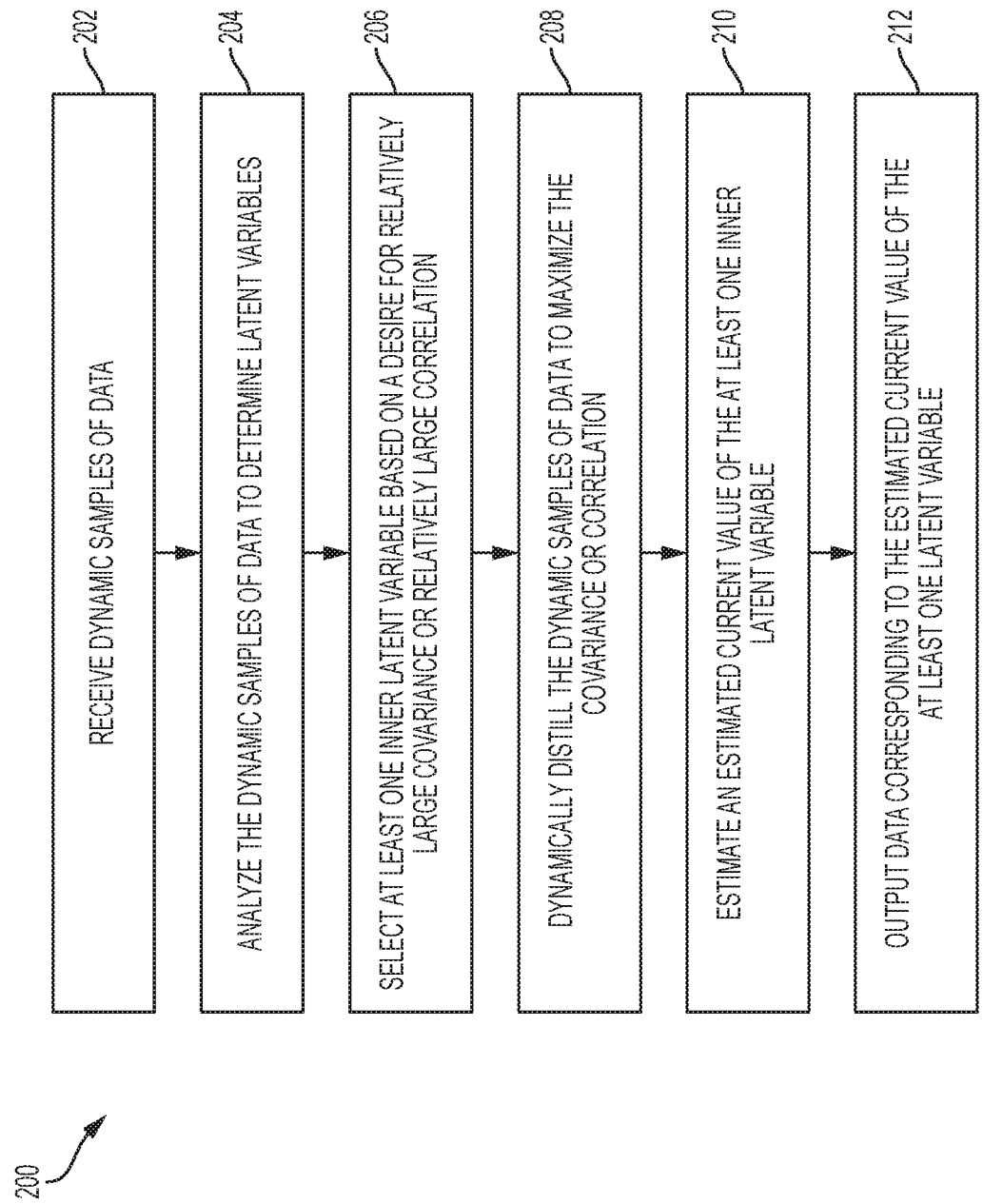
FIG. 2 is a flowchart illustrating a method for extracting principal time series data according to an embodiment of the present invention.

Turning now to FIG. 2, a method 200 for extracting a set of principal time series data of dynamic latent variables is shown. The method 200 may be performed by components of a system similar to the system 100 of FIG. 1.

In block 202, the controller may receive dynamic samples of data. The data may be detected by one or more sensor of a system or process. For example, the data may include one or more of a volume, a flow rate, a temperature, a pressure, or the like. The received data may be dynamic as the values may change over time. Each item of the received data may correspond to one of a plurality of original variables.

In block 204, the dynamic samples of data may be analyzed to determine or identify latent variables. For example, the dynamic samples of data may be analyzed using an algorithm such as dynamic-inner principal component analysis (DiPCA) or dynamic-inner canonical-correlation analysis (DiCCA), as will be described below.

In block 206, at least one inner latent variable may be selected by the controller. The at least one inner latent variable may correspond to at least one of the plurality of original variables. The at least one inner latent variable may be selected based on a desire for a relatively large covariance over time or a relatively large correlation over time. For example, the at least one inner latent variable may be selected based on a desire for a relatively large covariance between an estimated current value of the latent variable at a selected time and an actual value of the latent variable at the selected time. As another example, the at least one inner latent variable may be selected based on a desire for a relatively large correlation between an estimated current value of the latent variable at a selected time and an actual value of the latent variable at the selected time. The at least one inner latent variable may be selected as having a maximum covariance or a maximum correlation over time.

In block 208, the dynamic samples of data may be dynamically distilled by the controller. For example, the dynamic samples of data may be dynamically distilled to maximize the covariance or the correlation, based on whether the relatively large covariance or the relatively large correlation is desired in block 206.

In block 210, the controller may estimate an estimated current value of the at least one inner latent variable based on previous values of the at least one inner latent variable.

In block 212, the controller may control an output device to output data corresponding to the estimated current value of the at least one latent variable. For example, the output device may output the estimated current value. As another example, the output device may output a prediction that is made based on the estimated current value of the at least one latent variable, such as a remaining life of a corresponding system, or a malfunctioning portion of the corresponding system.

In various embodiments, the controller may control an actuator to take an action based on the estimated current value of the at least one latent variable. For example, the controller may identify a fault within a manufacturing or other process based on the estimated current value of the at least one latent variable, may identify a change to an actuator state that will correct the fault based on the estimated current value of the at least one latent variable, and may control the actuator to change to the actuator state to correct the fault.

As described above, the dynamic samples of data may be analyzed to determine a plurality of latent variables that represent variation in the dynamic samples of data using DiPCA.

DiPCA builds dynamic relations of inner latent variables that have maximized auto-covariance. DiPCA may extract one latent variable after another. The extracted variables may be a linear combination of the original variables. In a sense, the current values of the original variables are best predicted from their past values. As a consequence, the residuals after extracting the most predictable latent variables from the data will be least predictable data. In the limiting case, the remaining data tends to be white noise, and, thus, DiPCA may be used as a whitening filter. The DiPCA method overcomes drawbacks of existing dynamic PCA methods that simply perform static PCA on augmented data with time lags.

Various advantages of the DiPCA algorithm that extracts principal time series include that: (i) the dynamic components can be predicted from their past data as known information, so any uncertainty corresponds to the prediction errors only; (ii) the extracted dynamic components may highlight useful dynamic features for data interpretation and diagnosis, which are otherwise difficult to observe from the original data; and (iii) the prediction errors after all dynamics are effectively extracted are essentially not time-correlated and can be further modeled as static data with a traditional PCA method.

In general, it is desirable to extract dynamics in a latent variable $t_k$ so that the current value can be predicted from the past using the following auto-regressive (AR) model shown in Equation 1 below:

$$t_k = \beta_1 t_{k-1} + \ldots + \beta_s t_{k-s} + r_k \qquad \text{Equation 1}$$

with the latent variable as a linear combination of the original variables $t_k = x_k^T w$, where $\|\beta\|=1$, $\|w\|=1$, $x_k$ is the sample vector at time k, and w is the weight vector. If the quantity of time lags, s, is chosen to be sufficiently long that the residual $r_k$ is essentially white noise for each latent variable. The prediction from the dynamic inner model may be shown by Equation 2 below:

$$\hat{t}_k = x_{k-1}^T w \beta_1 + \ldots + x_{k-s}^T w \beta_s \qquad \text{Equation 2}$$
$$= [x_{k-1}^T \ldots x_{k-s}^T](\beta \otimes w)$$

In Equation 2, $\beta=[\beta_1 \beta_2 \ldots \beta_s]^T$ and w are constrained to be the unit norm without loss of generality, and $\beta \otimes w$ is the Kronecker product. The objective of the dynamic inner PCA algorithm is to maximize the covariance between the extracted data $t_k$ and the prediction $\hat{t}_k$, as shown in Equation 3 below:

$$\max_{w,\beta} \frac{1}{N} \sum_{k=s+1}^{s+N} w^T x_k [x_{k-1}^T \ldots x_{k-s}^T](\beta \otimes w) \qquad \text{Equation 3}$$

for (N+s) observations. The data matrix (corresponding to the dynamic samples of data) may be denoted as $X=[x_1 \, x_2 \, \ldots \, x_{N+s}]$, thus forming the data matrices shown in Equation 4 below:

$$X_i = [x_i \, x_{i+1} \ldots x_{N+i-1}]^T \text{ for } i=1,2,\ldots,s+1$$

$$Z_s = [X_s \, X_{s-1} \ldots X_1] \qquad \text{Equation 4}$$

The objective of DiPCA may also be formulated as shown below in Equation 5:

$$\max_{w,\beta} w^T X_{s+1}^T Z_s (\beta \otimes w) \qquad \text{Equation 5}$$
$$\text{s.t. } \|w\|=1, \|\beta\|=1$$

In Equation 5, S is the dynamic order of the model. The dimension of w is the same as the quantity of variables, which does not increase with the dynamic order of the model. After the weighting vector w is extracted, the latent score $t_k$ is calculated as $tk = x_k^T w$. It is clear that the most co-varying dynamic relationship is extracted between $t_k$ and $t_{k-1}, \ldots, t_{k-s}$ by the objective function. Therefore, an explicit dynamic model is built between the latent variables. Compared to other dynamic PCA algorithms, the objective function of DiPCA leads to the extraction of only dynamic latent relations. The residuals after all dynamic components are extracted contain little dynamic information and, therefore, can be analyzed using static PCA if so desired.

An algorithm for DiPCA can be performed as follows. Step 1: first, X may be scaled to have a zero mean and unit variance, and w may be initialized to a random unit vector. Latent variables w and β may then be extracted in step 2. For example, the following relations shown as Equation 6 may be iterated until convergence:

$$t = Xw \text{ and form } t_i \text{ from } t | \text{similar to the} \qquad \text{Equation 6}$$
$$\text{formation of } X_i \text{ for}$$
$$i = 1, 2, \ldots, s+1$$
$$\beta = [t_1 \, t_2 \, \ldots \, t_s]^T \bar{t}_{s+1}$$
$$w = \sum_{i=1}^{s} \beta_i (X_{s+1}^T t_i + X_i^T t_{s+1})$$
$$w := w/\|w\|$$
$$\beta := \beta/\|\beta\|$$

Next and after the weight vector w and latent scores t are obtained using the above, in step 3, X may be deflated using Equation 7 below, where the loading vector is p:

$$X := X - tp^T; \, p = X^T t/t^T t \qquad \text{Equation 7}$$

After deflation and in step 4, the algorithm returns to step 2 to extract the next latent variable, until l latent variables are extracted.

In step 5, dynamic inner modeling may occur. For example, a VAR model may be built for latent scores, and $T_{s+1}$ may be predicted using Equation 8 below:

$$\hat{T}_{s+1} = T_s \hat{\Theta} \qquad \text{Equation 8}$$

Furthermore, $X_{S+1}$ may be predicted as $X_{S+1} = \hat{T}_{s+1} P^T$ where $P = [P_1 P_2 \ldots P_l]$ is the loading matrix with each $P_i$ defined in Equation 7.

In step 6, static modeling of prediction errors may be performed. For example, traditional PCA may be performed on the prediction error matrix $E_{s+1}$ as shown in Equation 9 below:

$$E_{s+1} = X_{s+1} - \hat{T}_{s+1}P^T = T_r P_r^T + E_r \qquad \text{Equation 9}$$

Therefore, $X_{S+1}$ may be decomposed as $X_{S+1} = \hat{T}_{s+1}P^T + T_r P_r^T + E_r$ where the first term on the right hand side of the equal symbol is a prediction using past data, while other terms are projections of data involving the current data.

In DiPCA modeling, three parameters need to be determined: dynamic order s, the quantity of dynamic latent variables l, and the quantity of static latent variables. First, assuming s is determined, then l can be chosen such that 95 percent of auto-covariance is captured by the first l dynamic latent variables. Therefore, l is viewed as a function of s, which can be written as l=l(s). To determine the optimal s, a DiPCA model is built based on training the data first. Then, applying the model to the validation dataset facilitates obtaining the prediction error matrix $E_{S+1}^V$ of the validation data matrix. According to the previous analysis, little dynamic relationships are left in $E_{S+1}^V$. Therefore, the sample cross-correlation of any two variables in $E_{S+1}^V$ should be close to 0, except when lag=0. The calculation of the corresponding confidence bounds may then be found. When all the pairs of variables are considered, the total violations of the confidence bounds can be obtained for any (s, l(s)). The parameter (s, l(s)) corresponding to the minimum violations is determined to be optimal. To determine the quantity of static components, cumulative percentage of variance (CPV) may be applied.

The DiPCA algorithm has a different structure from static PCA and other dynamic PCA algorithms. Therefore, it is important to understand the geometric properties of the DiPCA projections and how the data space is partitioned. To explore the DiPCA geometric properties with j latent variables being extracted, subscript may be used to denote the succession from one latent variable to the next as follows: $X_{j+1} = X_j - \bar{t}_j p_j^T$ with $p_j = X_j^T \bar{t}_j / \bar{t}_j^T \bar{t}_j$.

The DiPCA algorithm may also be viewed as a whitening filter applied to the data. After all DiPCA components are extracted, the prediction errors are essentially white, as virtually all of the dynamic relationships in the data have been extracted. An important notion of this whitening filter is that it has a reduced quantity of latent variables relative to the quantity of variables in the data, and may be appropriate for modeling the common case of highly collinear data from real world problems. This solution is different from a full dimensional vector autoregressive (VAR) model that requires inversion of a covariance matrix, which can be ill-conditioned with highly correlated data. Furthermore, the DiPCA latent variables have a clear objective and can provide useful features for data based interpretation, visualization, and diagnosis.

In process monitoring based on PCA, squared prediction error (SPE) and Hotelling's $T^2$ are typically used for detecting abnormal situations. SPE monitors the variations in the residual subspace, and Hotelling's $T^2$ monitors variations in the principal component sub-space. Process monitoring based on DiPCA can be divided into two parts: the monitoring of dynamic relationships and the monitoring of static relationships. Dynamic latent scores, dynamic residuals, static latent scores, and static residuals can be calculated respectively as follows:

$$t_k = R^T x_k$$

$$v_k = t_k - \hat{t}_k; \hat{t}_k = \sum_{i=1}^{s} \Theta_i^T t_{k-i}$$

$$e_k = x_k - P\hat{t}_k$$

$$t_{r,k} = P_r^T e_k$$

$$e_{r,k} = (I - P_r P_r^T) e_k$$

It is clear that process monitoring should be performed on $\hat{t}_k$, $t_{r,k}$ and $e_{r,k}$, respectively. However, since $\hat{t}_k$ is dynamic and could even be non-stationary, monitoring t can result in a high false alarm rate. Therefore, the monitoring of $\hat{t}_k$ can be performed through $v_k$. Since $v_k$ can be cross-correlated, it is appropriate to build another PCA model on $v_k$ and construct a combined index to monitor $v_k$. The combined index for $v_k$ is defined as follows:

$$\varphi_v = v_k^T \Phi_v v_k = \frac{T_v^2}{\chi_v^2} + \frac{Q_v}{\delta_v^2}$$

$$\Phi_v = \frac{P_v \Lambda_v^{-1} P_v^T}{\chi_v^2} + \frac{I - P_v P_v^T}{\delta_v^2} \text{ where } \Lambda_v = \frac{1}{N-1} V^T V, T_v^2$$

and $Q_v$ are the fault detection indices for PCA based fault detection on $v_k$, and $X_v^2$ and $\delta_v^2$ are the corresponding control limits. In this way, the control region of the prediction $\hat{t}_k$ can also be indicated by the control region of the combined index $co_v$.

The DiPCA algorithm builds inherent dynamics in the latent variables with explicit projections from the data space to the latent space. However, its objective function, to maximize covariance, may not be as efficient as the canonical-correlation analysis (CCA) objective in maximizing prediction with the least latent dimensions. To obtain a principal time series that can be best predicted from its past values, a dynamic-inner CCA (DiCCA) algorithm is proposed. The objective function of DiCCA is to maximize correlation between latent variables.

Mathematically, it may be desirable to ensure that the dynamic latent variable $t_k$ is best predicted by $\hat{t}_k$. This is done by maximizing the correlation between $t_k$ and $\hat{t}_k$, which is represented by Equation 10 below:

$$\max \frac{\sum_{k=s+1}^{s+N} t_k \hat{t}_k}{\sqrt{\sum_{k=s+1}^{s+N} t_k^2} \sqrt{\sum_{k=s+1}^{s+N} \hat{t}_k^2}} \qquad \text{Equation 10}$$

It can be shown that when restricting $\sum_{k=s+1}^{s+N} t_k^2 = 1$ and $\sum_{k=s+1}^{s+N} \hat{t}_k^2 = 1$, maximizing Equation 10 is equivalent to minimizing $\sum_{k=s+1}^{s+N} (t_k - \hat{t}_k)^2$, the residual sum of squares of the prediction model under these constraints. Therefore, with the same prediction model and matrix notation as Equations 2 and 4, the objective of DiCCA may be rewritten as Equation 11 below:

$$\max \frac{w^T X_{s+1}^T (X_s w \beta_1 + \ldots + X_1 w \beta_s)}{\|X_{s+1} w\| \|X_s w \beta_1 + \ldots + X_1 w \beta_s\|} \qquad \text{Equation 11}$$

Equation 11 can be reformulated into the DiCCA objective function as shown below in Equation 12:

$$\max_{w,\beta} J = w^T X_{s+1}^T Z_s(\beta \otimes w) \quad \text{Equation 12}$$

$$\text{s.t. } \|X_{s+1}w\| = 1, \|Z_s(\beta \otimes w)\| = 1$$

In Equation 12, Xi and Zs are defined by Equation 4.

One dynamic correlation component may be extracted as follows. To solve the optimization problem in Equation 12, LaGrange multipliers are applied as shown in Equation 13 below:

$$L = w^T X_{s+1}^T Z_s(\beta \otimes w) + \tfrac{1}{2}\lambda_1(1 - w^T X_{s+1}^T X_{s+1} w) + \tfrac{1}{2}\lambda_2 (1 - (\beta \otimes w)^T Z_s^T Z_s(\beta \otimes w)) \quad \text{Equation 13}$$

Making use of the identities $(\beta \otimes w) = (\beta \otimes I)w = (I \otimes w)\beta$ and taking derivatives of L with respect to w and β results in Equations 14 and 15 below:

$$\frac{\partial L}{\partial w} = X_{s+1}^T Z_s(\beta \otimes w) + (\beta \otimes I)^T Z_s^T X_{s+1} w - \lambda_1 X_{s+1}^T X_{s+1} w - \lambda_2 (\beta \otimes I)^T Z_s^T Z_s(\beta \otimes I) w = 0 \quad \text{Equation 14}$$

$$\frac{\partial L}{\partial \beta} = (I \otimes w)^T Z_s^T X_{s+1} w - \lambda_2 (I \otimes w)^T Z_s^T Z_s(I \otimes w)\beta = 0 \quad \text{Equation 15}$$

Pre-multiplying Equation 15 by $\beta^T$ and using the constraint in Equation 12 results in $J = \lambda_2$. Pre-multiplying Equation 15 by $w^T$ and referring to the constraint in Equation 12 results in $2J - \lambda_1 - \lambda_2 = 0$, leading to $\lambda_1 = J$. Therefore, let $\lambda = \lambda_1 = \lambda_2$. Additionally, $T_s$ may be defined as follows in Equation 16:

$$T_s = Z_s | (I \otimes w) = \quad \text{Equation 16}$$
$$[X_s w \; X_{s-1} w \; \ldots \; X_1 w] = [t_s \; t_{s-1} \; \ldots \; t_1]$$

$$\hat{X}_{s+1} = Z_s(\beta \otimes I) = \sum_{i=1}^{s} \beta_i X_{s-i+1} \quad \text{Equation 17}$$

By combining Equations 16 and 17, Equation 18 is derived:

$$Z_s(\beta \otimes w) = \sum_{i=1}^{s} \beta_i X_{s-i+1} w = \hat{X}_{s+1} w = \hat{t}_{s+1} \quad \text{Equation 18}$$

where:

$$t = Xw \in \mathbb{R}^{s+N}$$

$$t_i = X_i w \in \mathbb{R}^N, \text{ for } i=1,2,\ldots,s+1 \quad \text{Equation 19}$$

Equation 15 may be rewritten as Equation 20 below:

$$T_s^T X_{s+1} w = \lambda T_s^T T_s \beta$$

or, $$(T_s^T T_s)^{-1} T_s^T X_{s+1} w = \lambda \beta \quad \text{Equation 20}$$

Similarly, Equation 14 may be rewritten as Equation 21 below:

$$X_{s+1}^T \hat{X}_{s+1} w + \hat{X}_{s+1}^T X_{s+1} w = \lambda (X_{s+1}^T X_{s+1} + \hat{X}_{s+1}^T \hat{X}_{s+1}) w$$

or, $$(X_{s+1}^T X_{s+1} + \hat{X}_{s+1}^T \hat{X}_{s+1})^+ (X_{s+1}^T \hat{X}_{s+1} + \hat{X}_{s+1}^T X_{s+1}) w = \lambda w \quad \text{Equation 21}$$

Where $(\;)^+$ denotes the Moore-Penrose pseudo-inverse, Equations 20 and 21 imply that w is the Eigenvector of $(X_{s+1}^T X_{s+1} + \hat{X}_{s+1}^T \hat{X}_{s+1})^+ (X_{s+1}^T \hat{X}_{s+1} + \hat{X}_{s+1}^T X_{s+1})$ corresponding to the largest Eigenvalue. However, since $\hat{X}_{s+1}$ depends on β and therefore β and w are coupled together, there is no analytical solution to the optimization problem in Equation 12. Equations 20 and 21 can be reorganized as follows using Equations 18 and 19, as shown in Equations 22 and 23 below:

$$\lambda w = (X_{s+1}^T X_{s+1} + \hat{X}_{s+1}^T \hat{X}_{s+1})^+ (X_{s+1}^T \hat{t}_{s+1} + \hat{X}_{s+1}^T t_{s+1}) \quad \text{Equation 22}$$

$$= \left( \begin{bmatrix} X_{s+1} \\ \hat{X}_{s+1} \end{bmatrix}^T \begin{bmatrix} X_{s+1} \\ \hat{X}_{s+1} \end{bmatrix} \right)^+ \begin{bmatrix} X_{s+1} \\ \hat{X}_{s+1} \end{bmatrix}^T \begin{bmatrix} \hat{t}_{s+1} \\ t_{s+1} \end{bmatrix}$$

$$= \begin{bmatrix} X_{s+1} \\ \hat{X}_{s+1} \end{bmatrix}^+ \begin{bmatrix} \hat{t}_{s+1} \\ t_{s+1} \end{bmatrix}$$

$$\lambda \beta = (T_s^T T_s)^{-1} T_s^T t_{s+1} \quad \text{Equation 23}$$

It is clear from Equation 23 that β depends on w implicitly through $T_i$. Also, β is proportional to the least squares solution of the AR model parameters of time series $\{t_k\}_{k=1,2,\ldots}$. Since w is an Eigenvector based on Equation 21, the norm of w is scaled to one. Therefore, β can be found to be the least squares solution from Equation 23.

The core DiCCA algorithm may be described in the following steps. In step 1, w may be initialized with a column of an identity matrix. In step 2, w and β may be calculated by iterating the following relations shown in Equation 24 below until convergence:

$$t = Xw \text{ and form } t_i \text{ from } t \text{ according to Eq. 19} \quad \text{Equation 24}$$

Form $T_s = [t_s \; \ldots \; t_1]$.

$$\beta = (T_s^T T_s)^{-1} T_s^T t_{s+1},$$

$$\hat{X}_{s+1} = \sum_{i=1}^{s} \beta_i X_{s-i+1},$$

$$\hat{t}_{s+1} = \sum_{i=1}^{s} \beta_i t_{s-i+1},$$

$$w = \begin{bmatrix} X_{s+1} \\ \hat{X}_{s+1} \end{bmatrix}^+ \begin{bmatrix} \hat{t}_{s+1} \\ t_{s+1} \end{bmatrix} \text{ and } w := w/\|w\|$$

In step 3, J may be calculated using Equation 25 below:

$$J = \lambda = \frac{\hat{t}_{s+1}^T t_{s+1}}{\|\hat{t}_{s+1}\| \|t_{s+1}\|} \quad \text{Equation 25}$$

To extract the next dynamic latent variable, the same iteration procedure can be applied to the deflated matrices of $X_{s+1}$ and $Z_s$, which will be discussed below.

After the loading vector w and latent scores t are obtained from the iteration procedure, x is deflated using Equation 26 below:

$$X := X - tp^T \quad \text{Equation 26}$$

Where the loading vector p is defined in Equation 27 below:

$$p = X^T t / t^T t \quad \text{Equation 27}$$

The deflated matrix X is then used to repeat the same iteration procedure to extract the next latent variable. The deflation procedure leads to desirable geometric properties of the DiCCA algorithm. For instance, the score vectors t from different latent variables are orthogonal.

After obtaining the latent variable $t_k$, an AR model can be built to describe the dynamics in $t_k$ as shown below in Equation 28:

$$t_k = \alpha_1 t_{k-1} + \ldots + \alpha_s t_{k-s} + \varepsilon_k \quad \text{Equation 28}$$

The solution to the estimate $\alpha$ is ordinary least squares, which coincidentally is already solved in the iterative algorithm as $\beta$. Therefore, there is no need to fit another AR model.

With other dynamic data modeling algorithms, a re-estimation of $\beta$ may be performed after an outer model projection. The extraction of the latent variables and dynamic modeling of the latent variables are achieved simultaneously in DiCCA, because DiCCA employs consistent outer modeling and inner modeling objectives. This is a unique property of DiCCA and makes it a more efficient dynamic modeling algorithm than the others.

The DiCCA algorithm extracts latent time series variables one by one with descending predictability, or $R^2$, values. After l latent time series variables are extracted, the next latent time series variable that is extracted will have a $R^2$ value close to 0, which implies that there are little or no dynamics left in the residuals. The orthogonality of the latent scores guarantees that the quantity of latent time series variables required to extract all dynamics is fewer than the quantity of variables, which will be shown below. Mathematically, by using $t_k^{(j)}$ to denote the $j^{th}$ latent score at time k, and $\beta_{ji}$ for i=1, 2, . . . s to denote the AR coefficients for the $j^{th}$ latent score, the prediction model for each score may be shown in Equation 29 below:

$$\hat{t}_k^{(j)} = (\beta_{j1} q^{-1} + \beta_{j2} q^{-2} + \ldots + \beta_{js} q^{-s}) t_k^{(j)} \quad \text{Equation 29}$$
$$= G_j(q^{-1}) t_k^{(j)}$$

In Equation 29, $q^{-1}$ is a backwards shift operator. By combining l prediction models together, a prediction model for the latent score vector $tk = [t_k^{(1)} \ t_k^{(2)} \ \ldots \ t_k^{(l)}]^T$ may be shown in Equation 30 below:

$$\hat{t}_k = G(q^{-1}) t_k \quad \text{Equation 30}$$
$$= \text{diag}(G_1(q^{-1}), G_2(q^{-1}), \ldots, G_l(q^{-1})) t_k$$

Equation 30 may be used to derive the one step prediction error as shown in Equation 31 below, which may correspond to a whitening filtered error.

$$e_k = x_k - P\hat{t}_k = x_k - PG(q^{-1}) t_k \quad \text{Equation 31}$$

When the quantity of dynamic latent variables l is selected to extract all dynamics in the data, little or no dynamics will remain in $e_k$. Furthermore, PCA modeling of $e_k$ may be appropriate if it is desired to extract a covariance structure in the prediction error.

Additionally, since little or no dynamics remain in $e_k$ after removal of the prediction error, DiCCA may be interpreted as a whitening filter which removes all dynamics in the data. The whitening filter may be written as shown in Equation 32 below:

$$e_k = (I - PG(q^{-1}) R^T) x_k \quad \text{Equation 32}$$

Figure 3:
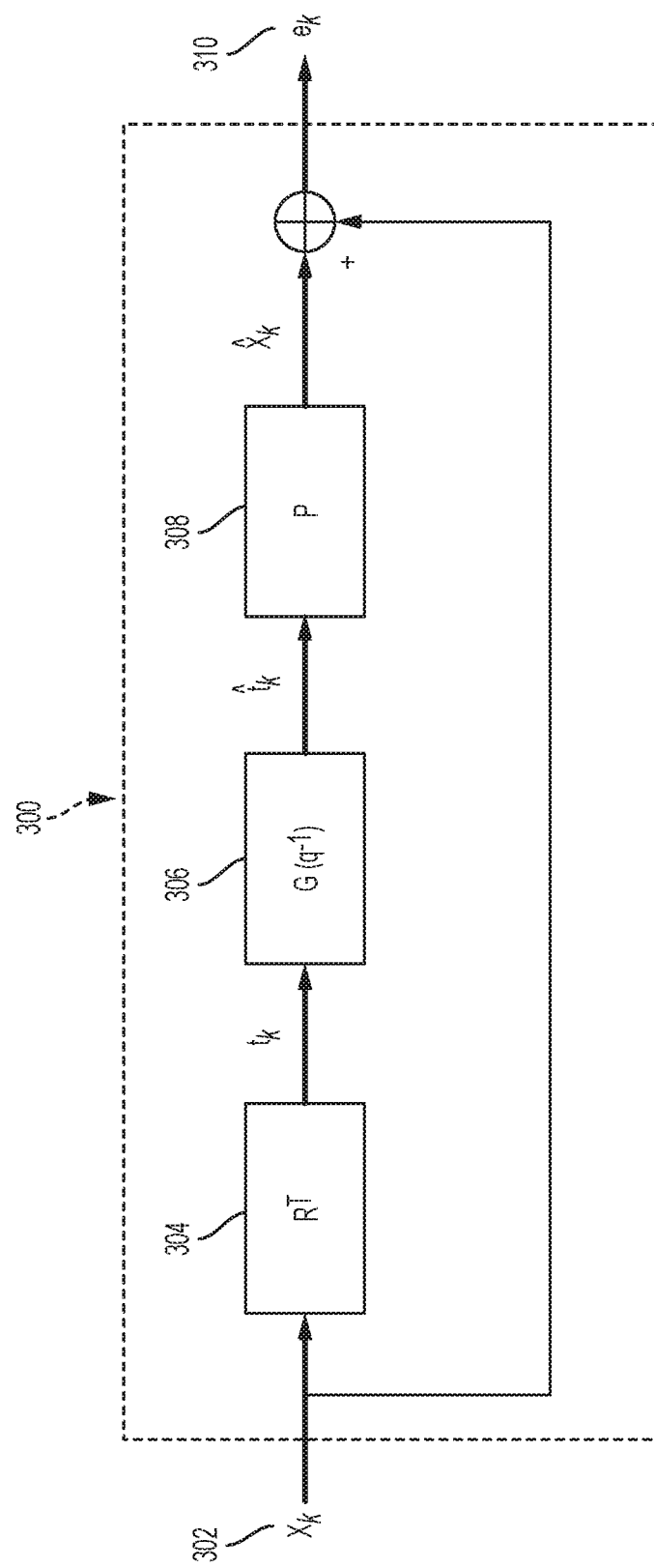
FIG. 3 illustrates an exemplary dynamic whitening filter structure using DiCCA according to an embodiment of the present invention.

FIG. 3 illustrates an exemplary dynamic whitening filter structure 300 using DiCCA. As shown, the filter structure 300 receives the dynamic samples of data 302 $x_k$. The data is applied to the matrix 304 $R^T$, the dynamic transfer function 306 $G(q^{-1})$, and the projection 308 P. The result of the projection 308 is subtracted from the dynamic samples of data 302 $x_k$ to provide the white noise 310 $e_k$.

With the objective of maximizing covariance or correlation between the latent time series and its prediction from the past, DiPCA and DiCCA each perform dynamic data distillation from all measured data such that the extracted dynamic components co-vary or correlate the most with their past. These most predictable dynamic components are referred to as principal time series that are latent in the original data. The prediction errors of the data after the first predicted component is extracted are then used to extract the second most predictable latent component, until all significant dynamic components are extracted. This procedure is analogous to a multi-stage binary distillation process, with each stage separating the most dynamic component from others. The leftovers after all dynamic components are extracted are essentially un-correlated in time, resembling white noise.

Figure 4:
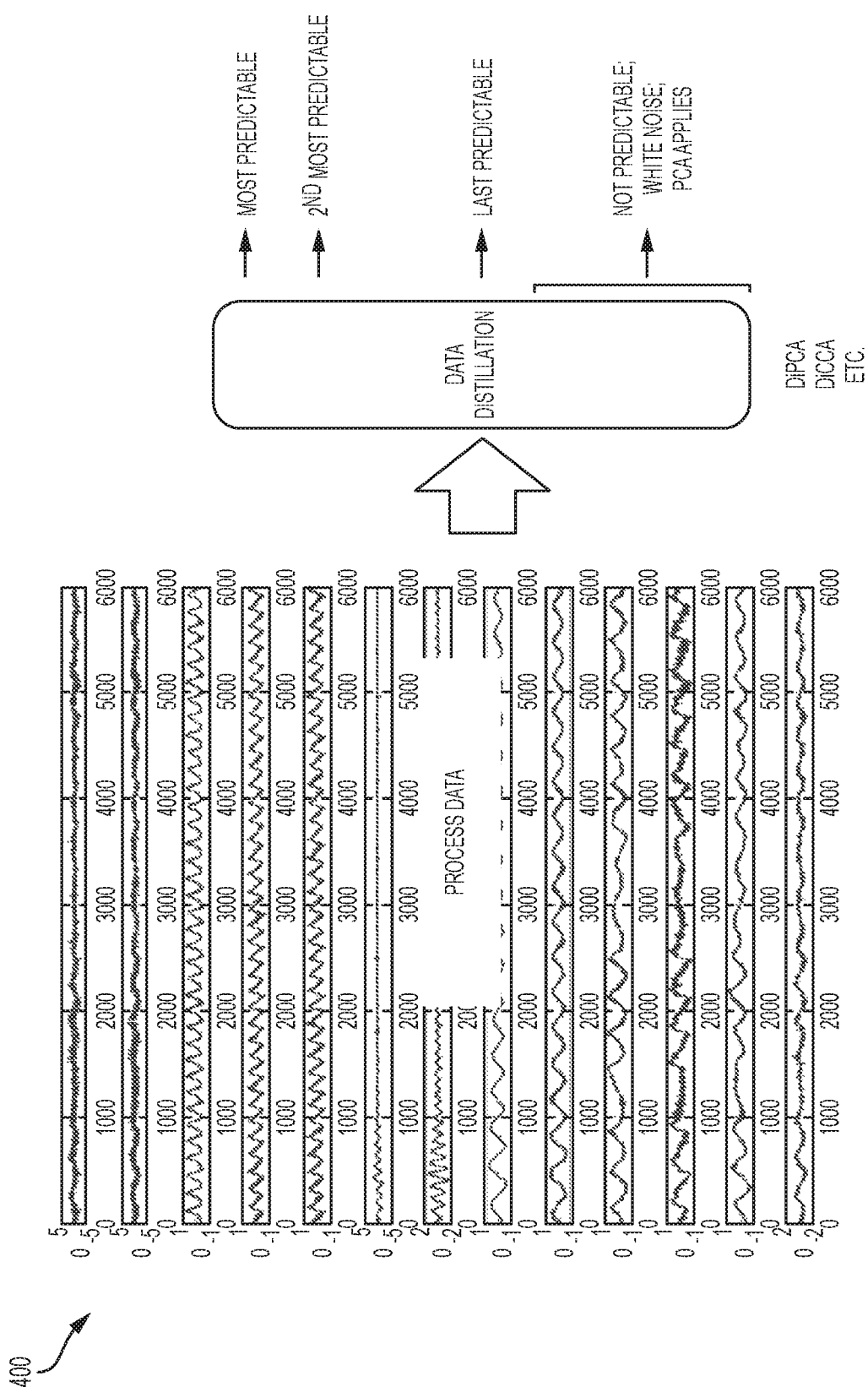
FIG. 4 illustrates a system to show how dynamic latent variable analytics distill dynamic latent components according to an embodiment of the present invention.

FIG. 4 shows a system 400 to illustrate how these dynamic latent variable analytics distill dynamic latent components one after another, with the objective to maximize the covariance or correlation between the component and their prediction from the past data. High dimensional time series data are considered as a mixture of a number of dynamic latent components, which are not measured directly, and static errors. DiPCA and DiCCA distill the multi-dimensional data into dynamic components in descending order of covariance or correlation, respectively.

Figure 5:
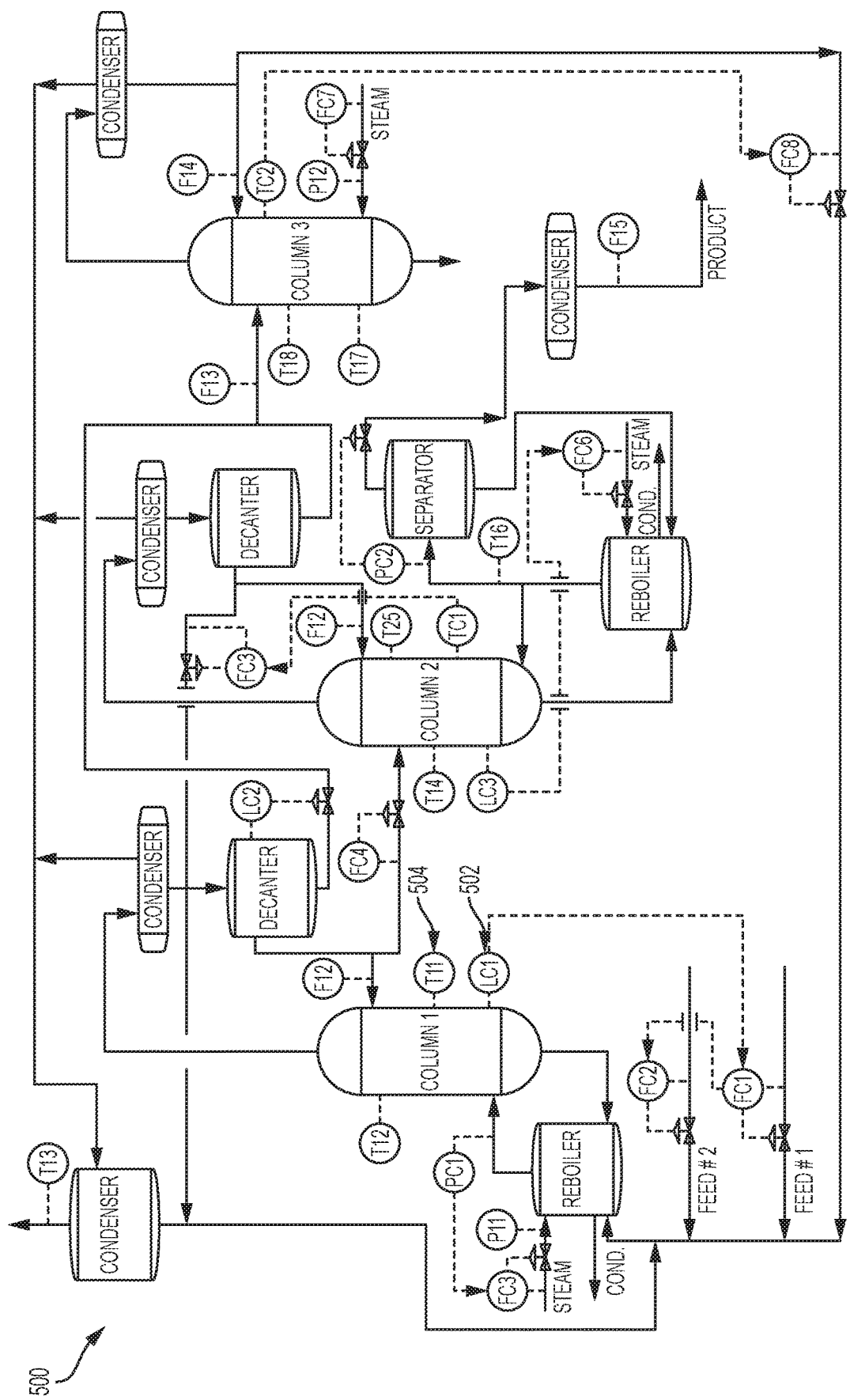
FIG. 5 illustrates a chemical plant from the Eastman Chemical Company for chemical manufacturing that was used for DiPCA and DiCCA experimentation according to an embodiment of the present invention.

FIG. 5 illustrates a chemical plant 500 from the Eastman Chemical Company for chemical manufacturing that was used for DiPCA and DiCCA experimentation. The chemical plant 500 includes controllers 502 (that include sensors or otherwise measure and output data) and sensors, or indicators, 504 that output measured data. For example, the controllers 502 and indicators 504 may output temperatures, flow rates, fluid levels, or the like.

The Eastman Chemical Company had identified a need to diagnose a common oscillation of about two hours (with about 340 samples per cycle). Early work focused on the diagnosis of this oscillation. Using Granger causality analysis, five process variables were identified to have strong oscillations. These five variables were selected for this disclosure to illustrate how the dynamic data and features can be modeled using DiPCA and DiCCA.

Figure 6:
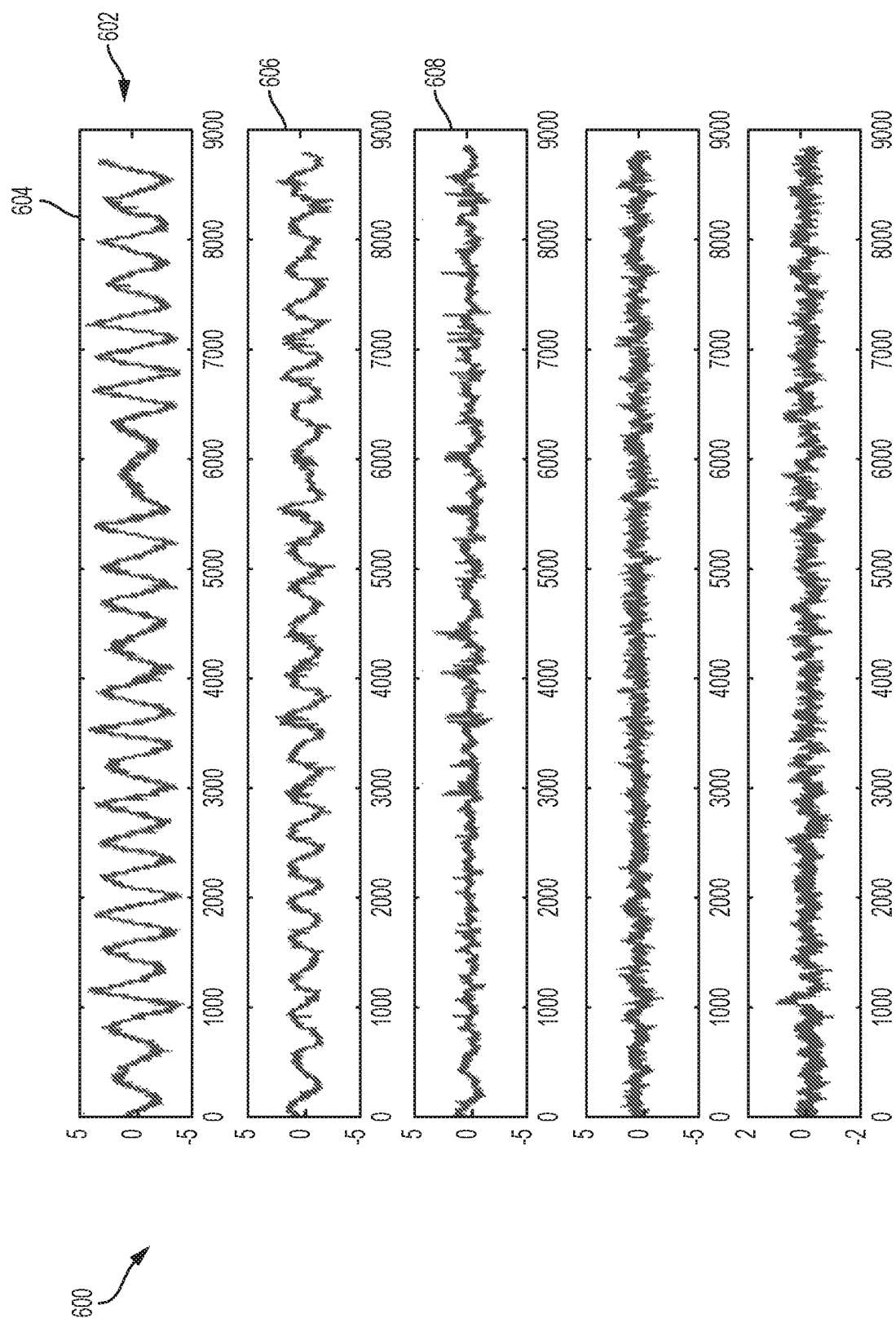
FIG. 6 is a plot illustrating the five dynamic PCs that were identified using DiPCA according to an embodiment of the present invention.

Using DiPCA on the five process variables leads to five dynamic principal components (PCs). FIG. 6 is a plot 600 illustrating the five dynamic PCs 602 with the most dynamic latent variable (with maximum covariance) at the top and the least dynamic latent variable at the bottom. The autoregression order of the dynamics is chosen as 21, which makes the prediction errors of the dynamic principal components essentially white.

Figure 7:
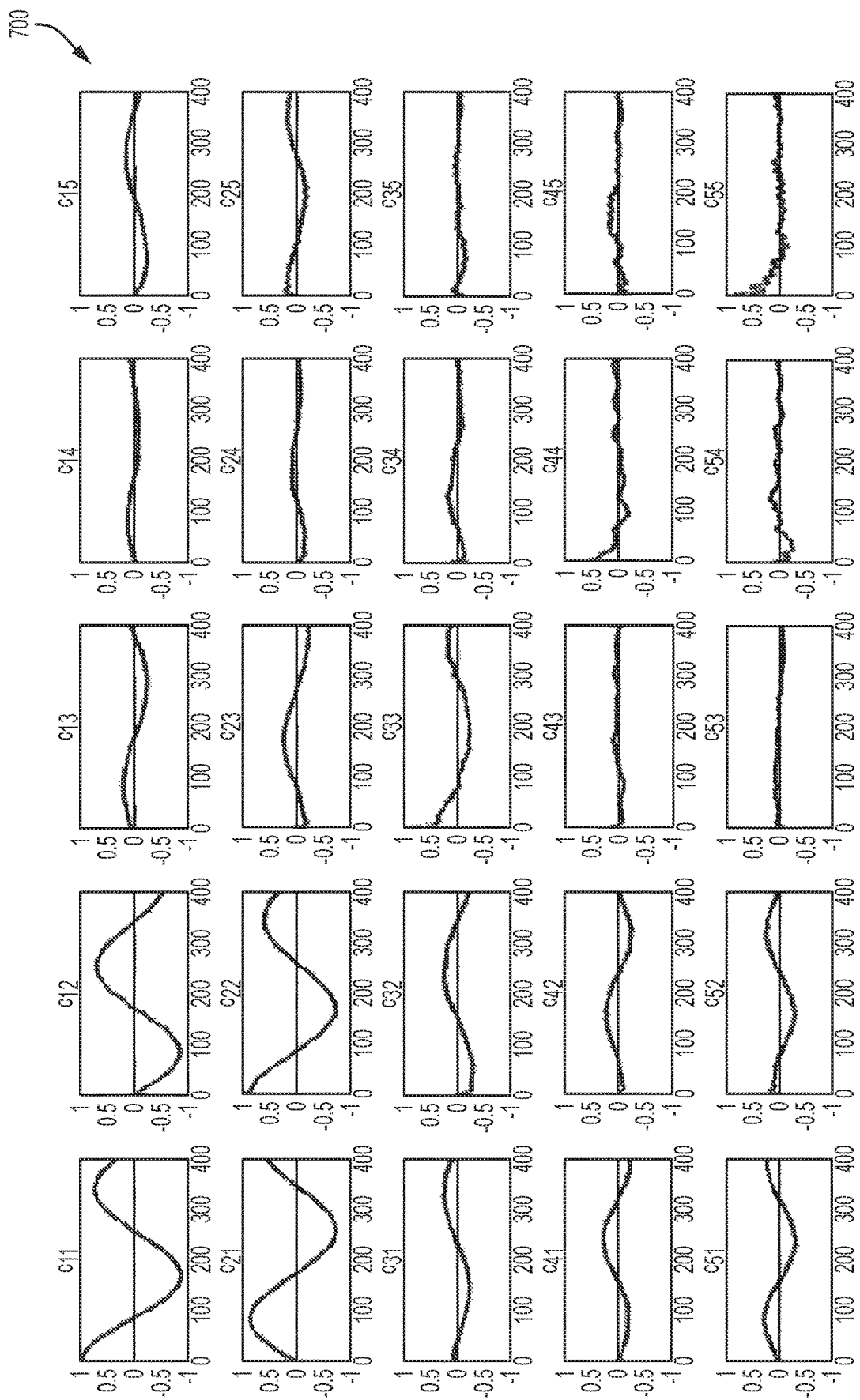
FIG. 7 is a plot illustrating auto-correlation and cross-autocorrelation for the five dynamic PCs of FIG. 6 according to an embodiment of the present invention.
Figure 8:
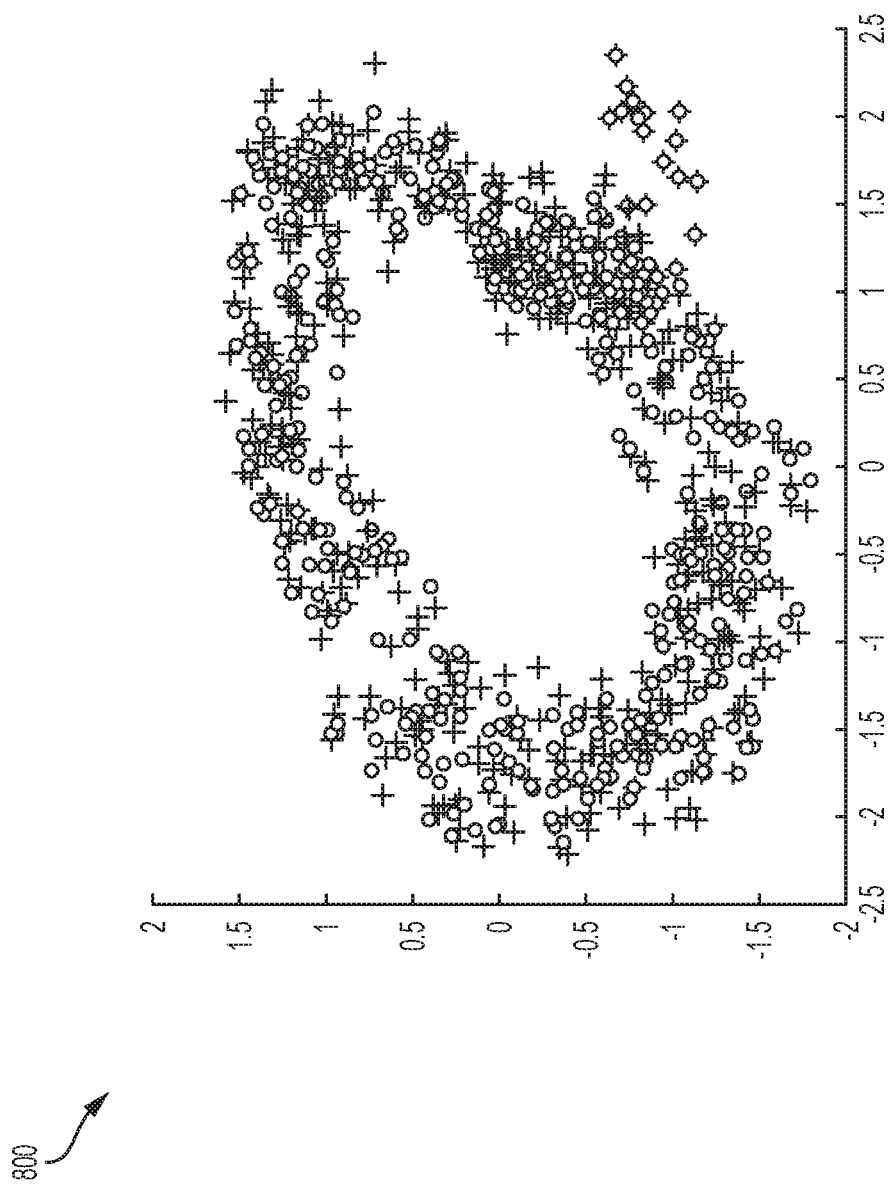
FIG. 8 is a plot illustrating the first two DiPCA PCs of FIG. 6 and predictions from their past scores according to an embodiment of the present invention.

FIG. 7 is a plot 700 illustrating the auto-correlation and cross-autocorrelation for the five dynamic PCs. Referring to FIGS. 6 and 7, it is clear that the first two PCs 604, 606 are very oscillatory, while the third PC 608 is still somewhat oscillatory and co-varies with the first two PCs 604, 606. To visualize how the DiPCA model predicts the PCs, the first two DiPCA PCs and the predictions from their past scores are shown in a plot 800 in FIG. 8. The circular shape shows the co-varying oscillations at the same frequency.

Figure 9:
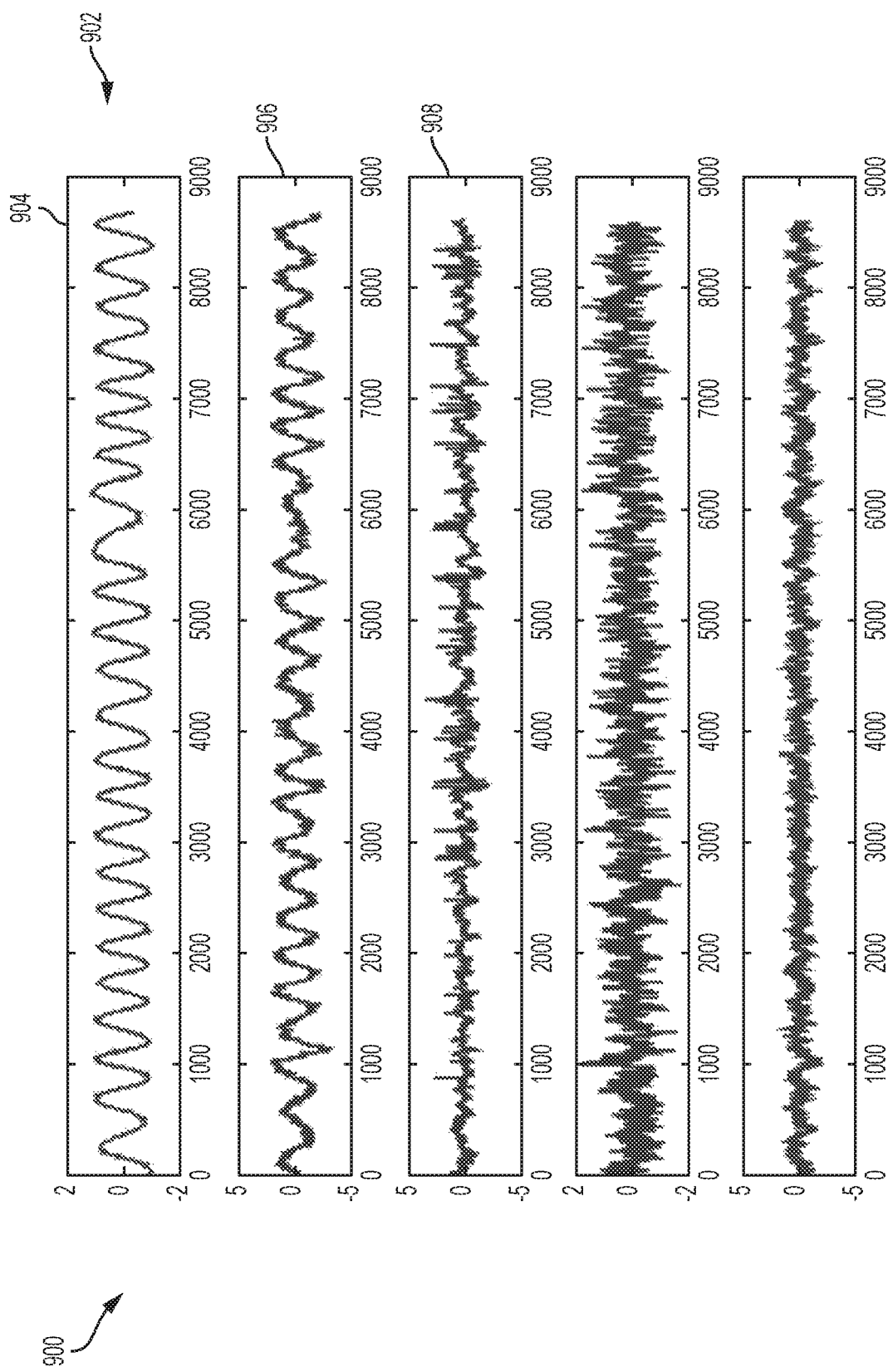
FIG. 9 is a plot illustrating five dynamic PCs that were identified using DiCCA according to an embodiment of the present invention.
Figure 10:
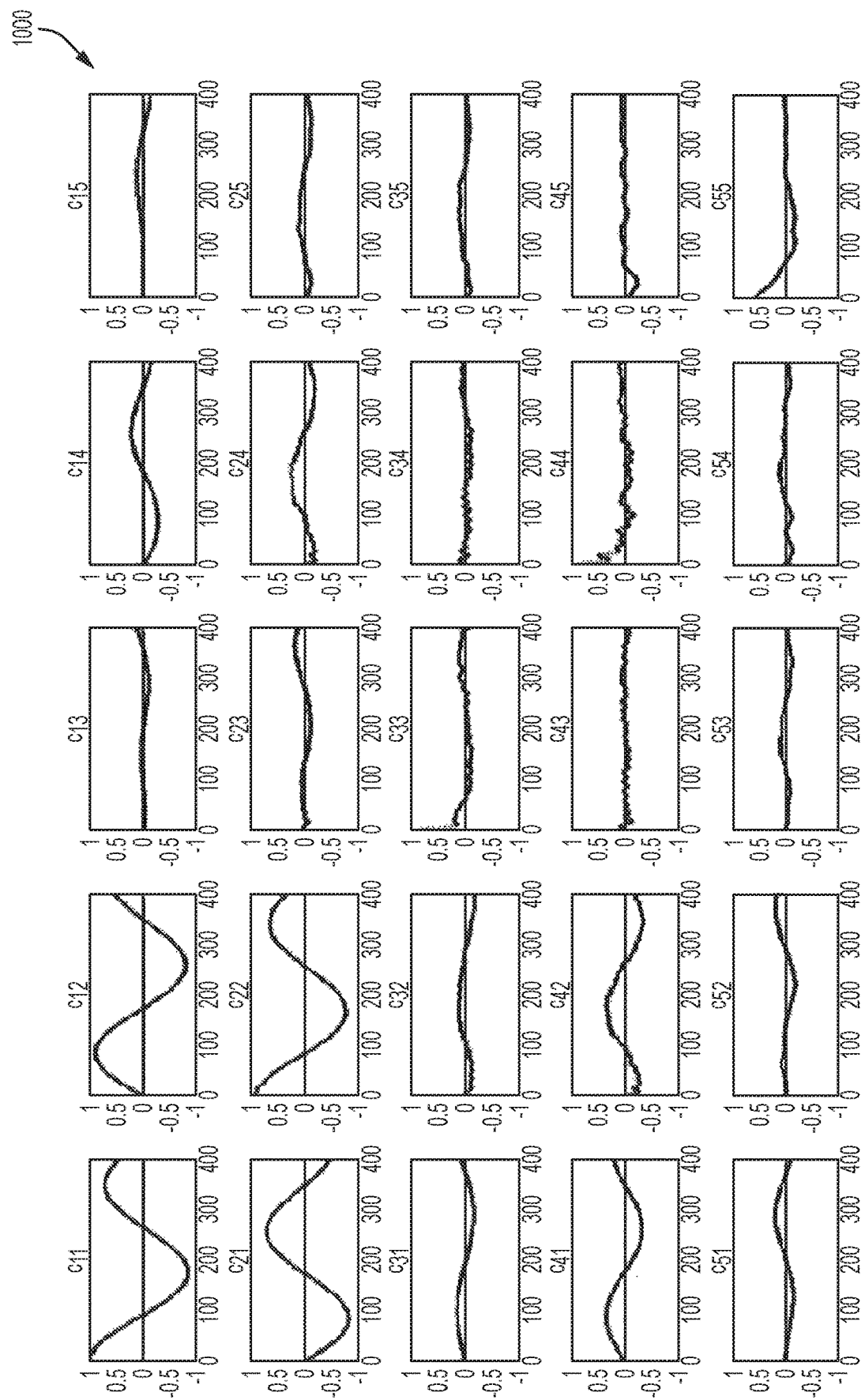
FIG. 10 is a plot illustrating autocorrelation and cross-autocorrelation for the five DiCCA PCs of FIG. 9 according to an embodiment of the present invention.

DiCCA was then used to model the five process variables, which again leads to five dynamic PCs. FIG. 9 is a plot 900 illustrating the five PCs 902 which were distilled from the five process variables. The order of the dynamics was chosen as 22, which was selected such that the errors predicted with the dynamic PCs were essentially white. FIG. 10 is a plot 1000 illustrating the autocorrelation and cross-autocorrelation for the five DiCCA PCs. Referring to FIGS. 9 and 10, is clear that the first two PCs 904, 906 are very oscillatory, while the third PC 908 has little correlation to the first two PCs 904, 906.

Figure 11:
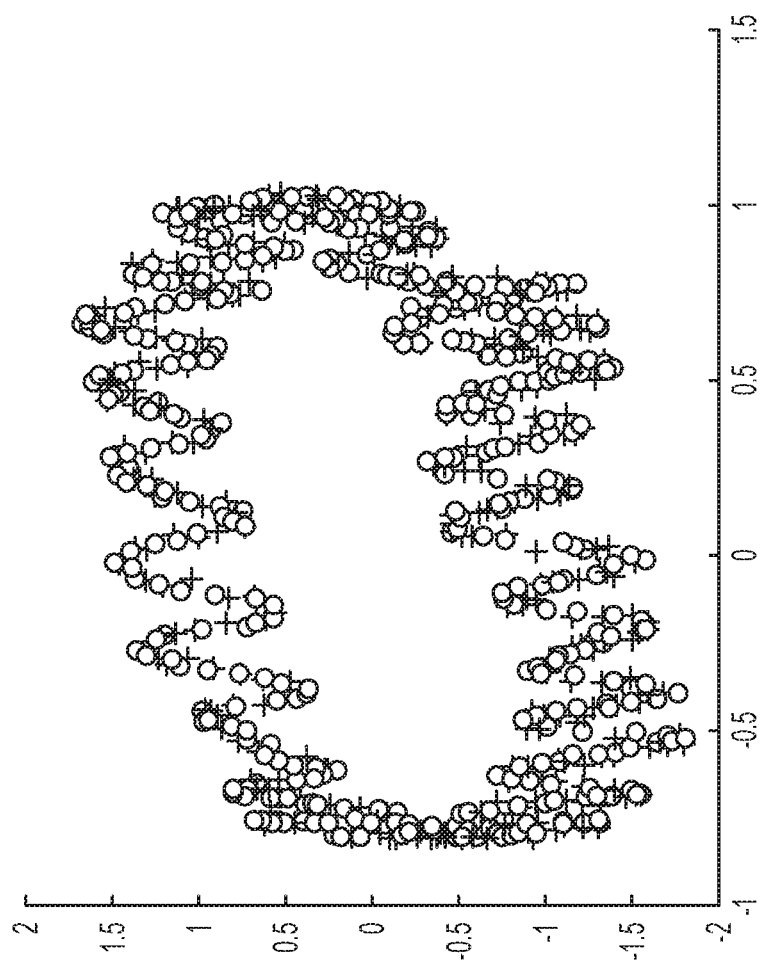
FIG. 11 is a plot illustrating the first two DiCCA PCs of FIG. 9 and predictions from their past scores according to an embodiment of the present invention.

To visualize how the DiCCA model predicts the PCs, the first two DiCCA PCs and the predictions from their past scores are shown in a plot 1100 of FIG. 11. While the large circular shape illustrates co-varying oscillations at the same frequency, there is a clear smaller oscillation with a higher frequency that is best captured by the second PC. This feature is not observed at all using DiPCA analysis. The DiCCA scatterplot has clear but faster oscillations on top of the large circular shape, indicating that there is another high frequency oscillation component. This frequency is likely caused by another control loop with valve stiction. The fact that DiCCA detects a new feature may indicate that DiCCA is better suited for extracting dynamic features than DiPCA. However, DiPCA may be better suited for extracting dynamic features in some situations.

Process data analytics have been applied in chemical process operations for decades. Although latent variable methods have been successfully applied to static data analysis, the methods presented in this disclosure (DiPCA and DiCCA) appear to be the first class of methods that maximize the dynamic content of the projected latent scores. The principal dynamic latent variables are most predictable components in the whole data space, and therefore have the least prediction errors. In the industrial data example from the Eastman Chemical Company disclosed herein, the sustained dynamic oscillatory content is undesirable in process operations. Further diagnostic analysis reveals what they are and where they come from. By fixing the causes, the excessive oscillations may be eliminated.

With the advancement of analytics in other sectors of industries and business operations, there appear to be many more research opportunities in the future. While physical and chemical sciences develop principles which enable mechanistic models to be established for process understanding, data analytics provide real and up-to-date information that reflects changes and uncertainty in the operation, and provide a reliable source of information to detect emerging situations.

Prediction, visualization, and interpretation of massive data with latent variables are powerful tools for dealing with high dimensional and highly correlated data. The benefit of data analytics is to turn data into knowledge and support effective operations and decision-making, which help push beyond the traditional boundaries.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents. Where used throughout the disclosure and claims, "at least one of A or B" includes "A" only, "B" only, or "A and B."

What is claimed is:

1. A method for extracting a set of principal time series data of dynamic latent variables comprising:
    detecting, by a plurality of sensors, dynamic samples of data each corresponding to one of a plurality of original variables;
    analyzing, using a controller, the dynamic samples of data to determine a plurality of latent variables that represent variation in the dynamic samples of data;
    selecting, by the controller, at least one inner latent variable that corresponds to at least one of the plurality of original variables; and
    estimating an estimated current value of the at least one inner latent variable based on previous values of the at least one inner latent variable,
    wherein selecting the at least one inner latent variable includes selecting the at least one inner latent variable based on a desire for a relatively large correlation between the estimated current value of the at least one inner latent variable at a selected time and an actual current value of the at least one inner latent variable at the selected time.

2. The method of claim 1 wherein analyzing the dynamic samples of data is performed using at least one of dynamic-inner principal component analysis (DiPCA) or dynamic-inner canonical-correlation analysis (DiCCA).

3. The method of claim 1 wherein:
    selecting the at least one inner latent variable of a first set of original variables includes selecting the at least one inner latent variable from the first set of original variables based on a desire for a relatively large correlation between the estimated current value of the at least one inner latent variable at a selected time and an actual current value of the at least one inner latent variable at the selected time; and
    the estimated current value of the at least one inner latent variable at the selected time is estimated from at least one of past values of the at least one inner latent variable or past values of at least another inner latent variable of another set of original variables.

4. The method of claim 1 wherein the at least one inner latent variable corresponds to a dynamic relationship between at least some of the dynamic samples of data.

5. The method of claim 1 wherein the dynamic samples of data correspond to at least one of process data or equipment data used in a data-driven process.

6. The method of claim 1 wherein the dynamic samples of data contain oscillating dynamics.

7. The method of claim 1 wherein the method is utilized to perform Granger causality analysis.

8. The method of claim 1 wherein the dynamic samples of data are inner latent dynamic samples.

9. The method of claim 1 further comprising outputting, by an output device, output data corresponding to the estimated current value of the at least one inner latent variable.

10. A method for extracting a set of principal time series data of dynamic latent variables comprising:
    receiving, by a controller, dynamic samples of data each corresponding to one of a plurality of original variables;
    analyzing, using the controller, the dynamic samples of data to determine a plurality of latent variables that represent variation in the dynamic samples of data;

selecting, by the controller, at least one inner latent variable that corresponds to at least one of the plurality of original variables based on a desire for:
a relatively large correlation between the estimated current value of the at least one inner latent variable at the selected time and the actual current value of the at least one inner latent variable at the selected time; and
estimating, by the controller, the estimated current value of the at least one inner latent variable based on previous values of the at least one inner latent variable.

11. The method of claim 10 wherein analyzing the dynamic samples of data is performed using at least one of dynamic-inner principal component analysis (DiPCA) or dynamic-inner canonical-correlation analysis (DiCCA).

12. The method of claim 10 wherein:
selecting the at least one inner latent variable of a first set of original variables includes selecting the at least one inner latent variable from the first set of original variables based on a desire for a relatively large correlation between the estimated current value of the at least one inner latent variable at a selected time and an actual current value of the at least one inner latent variable at the selected time; and
the estimated current value of the at least one inner latent variable at the selected time is estimated from at least one of past values of the at least one inner latent variable or past values of at least another inner latent variable of another set of original variables.

13. The method of claim 10 wherein the estimated current value of the at least one inner latent variable at the selected time is estimated from at least one its past values of the at least one inner latent variable or past values of at least another inner latent variable of another set of original variables.

14. The method of claim 10 wherein the at least one inner latent variable corresponds to a dynamic relationship between at least some of the dynamic samples of data.

15. A system for extracting a set of principal time series data of dynamic latent variables comprising:
a plurality of sensors configured to detect dynamic samples of data each corresponding to one of a plurality of original variables;
an output device configured to output data; and
a controller coupled to the plurality of sensors and configured to:
analyze the dynamic samples of data to determine a plurality of latent variables that represent variation in the dynamic samples of data,
select at least one inner latent variable that corresponds to at least one of the plurality of original variables,
estimate an estimated current value of the at least one inner latent variable based on previous values of the at least one inner latent variable, and
control the output device to output data based on the estimated current value of the at least one inner latent variable,
wherein the controller is configured to select the at least one inner latent variable based on a desire for a relatively large correlation between the estimated current value of the at least one inner latent variable at a selected time and an actual current value of the at least one inner latent variable at the selected time.

16. The system of claim 15 wherein the controller is configured to analyze the dynamic samples of data using at least one of dynamic-inner principal component analysis (DiPCA) or dynamic-inner canonical-correlation analysis (DiCCA).

17. The system of claim 15 wherein the estimated current value of the at least one inner latent variable at the selected time is estimated from at least one of past values of the at least one inner latent variable or past values of at least another inner latent variable of another set of original variables.

* * * * *